US010378990B2

(12) United States Patent
Shi et al.

(10) Patent No.: US 10,378,990 B2
(45) Date of Patent: Aug. 13, 2019

(54) GRAVITY-BASED LIGHT PRESSURE CALIBRATING DEVICE AND CORRESPONDING METHOD

(71) Applicant: Northwestern Polytechnical University, Xi'An Shaanxi (CN)

(72) Inventors: Aiming Shi, Xi'An Shaanxi (CN); Li Jiang, Xi'An Shaanxi (CN)

(73) Assignee: Northwestern Polytechnical University, Xi'An Shaanxi (CN)

( * ) Notice: Subject to any disclaimer, the term of this patent is extended or adjusted under 35 U.S.C. 154(b) by 392 days.

(21) Appl. No.: 15/380,231

(22) Filed: Dec. 15, 2016

(65) Prior Publication Data

US 2017/0205305 A1    Jul. 20, 2017

(30) Foreign Application Priority Data

Jan. 19, 2016    (CN) .......................... 2016 1 0034127

(51) Int. Cl.
*G01L 25/00*    (2006.01)
*G01V 7/00*    (2006.01)

(52) U.S. Cl.
CPC ................ *G01L 25/00* (2013.01); *G01V 7/00* (2013.01)

(58) Field of Classification Search
None
See application file for complete search history.

(56) References Cited

U.S. PATENT DOCUMENTS

| 3,808,550 | A | * | 4/1974 | Ashkin | ..................... H01S 3/08 250/251 |
| 4,676,644 | A | * | 6/1987 | Canteloup | ............ G01B 11/065 216/60 |
| 6,444,972 | B1 | | 9/2002 | Datskos et al. | |
| 8,786,841 | B2 | * | 7/2014 | Barlett | ............. H01L 21/67248 356/446 |
| 8,891,073 | B2 | * | 11/2014 | Effenberger, Jr. | ........ G01J 3/18 356/318 |
| 9,175,960 | B1 | * | 11/2015 | Compton | ............... G01C 19/58 |
| 9,274,135 | B2 | * | 3/2016 | Kilpatrick | ............. G01B 11/14 |
| 9,829,374 | B2 | * | 11/2017 | Kilpatrick | ................ G01P 3/36 |
| 2004/0004184 | A1 | * | 1/2004 | Schubert | ............... B01D 59/34 250/284 |
| 2008/0019010 | A1 | * | 1/2008 | Govorkov | .......... B23K 26/0613 359/641 |

(Continued)

FOREIGN PATENT DOCUMENTS

CN    1030476 A    1/1989
CN    102252753 A    11/2011
(Continued)

OTHER PUBLICATIONS

Myrabo, Leik N., et al. "Laser-boosted light sail experiments with the 150-kW LHMEL II CO 2 laser." High-Power Laser Ablation IV. vol. 4760. International Society for Optics and Photonics, 2002. (Year: 2002).*

(Continued)

*Primary Examiner* — Shawn Decenzo
(74) *Attorney, Agent, or Firm* — Zhong Law, LLC

(57) ABSTRACT

A gravity-based light pressure calibrating device includes a vacuum chamber, a calibration platform, and laser emitters and laser beam expanders, laser beam expanders changing a point light source to an area light source.

8 Claims, 4 Drawing Sheets

(56) References Cited

U.S. PATENT DOCUMENTS

| | | | | |
|---|---|---|---|---|
| 2008/0031088 | A1* | 2/2008 | Ukita | B01F 7/0025 366/261 |
| 2012/0197005 | A1* | 8/2012 | Benmore | B01J 19/10 530/350 |
| 2015/0076359 | A1* | 3/2015 | Bykanov | H05G 2/008 250/372 |
| 2016/0195729 | A1* | 7/2016 | Lambert | H05G 2/008 250/504 R |
| 2016/0311021 | A1* | 10/2016 | Elfstroem | B22F 3/1055 |
| 2016/0379793 | A1* | 12/2016 | Kar | H05H 7/04 315/5.35 |
| 2017/0016968 | A1* | 1/2017 | Salit | G01R 33/26 |
| 2017/0196074 | A1* | 7/2017 | Poole | H05H 15/00 |
| 2018/0079003 | A1* | 3/2018 | Lin | B23K 15/0086 |

FOREIGN PATENT DOCUMENTS

| | | | |
|---|---|---|---|
| CN | 102322951 | A | 1/2012 |
| CN | 103728017 | A | 4/2014 |
| CN | 105527020 | A | 4/2016 |

OTHER PUBLICATIONS

Li ZhiRui, et al., "Nonlinear electrical conductivity characteristics of nanostructured aluminum films", Journal of Beijing, University of Chemical Technology (Natural Science), 2012, vol. 39, No. 2, 4 pages (in Chinese).

Li ZhiRui, et al., "Nonlinear electrical conductivity characteristics of nanostructured aluminum films", School of Science, Beijing University of Chemical Technology, Beijing 100029, China), 8 pages (English Translation).

First Official Action for Application No. CN 201610034127.4, dated Sep. 7, 2017, 1 page (Chinese).

First Official Action for Application No. CN201610034127.4, dated Sep. 7, 2017, 1 page (English).

Search Report for Application No. CN201610034127.4, dated Jan. 19, 2016, 1 page (Chinese).

Search Report for Application No. CN201610034127.4, dated Jan. 19, 2016, 1 page (English).

Jinsong Cui, "The development of optical pressure observation instrument", Physical Experiment vol. 19, Issue No. 01, dated Jan. 20, 1999, 1 page.

Yipeng Yuan, "Laser light pressure energy meter", Applied Laser Journal, vol. 8, Issue No. 5, dated May 31, 1989, 1 page.

* cited by examiner

GRAVITY-BASED LIGHT PRESSURE CALIBRATING DEVICE AND CORRESPONDING METHOD

CROSS-REFERENCE TO RELATED APPLICATIONS

The present application claims priority to China Patent Application Serial No. CN 201610034127.4 filed on Jan. 19, 2016, which is hereby incorporated by reference in its entirety.

TECHNICAL FIELD

The disclosure relates to light-pressure calibration, and more particularly to a gravity-based light pressure calibrating device and a corresponding calibration method.

BACKGROUND

The quantum theory reveals the wave-particle duality of light. In view of wave and particle both having momentum, an object may gain kinetic energy when light directly illuminates the object that reflects according to the momentum theorem.

In recent years, solar sails have been a hot subject of future deep-space exploration spacecraft. Operating as outer space devices without carrying propellant, solar sails use light pressure as their main power source. Moreover, with the increasing development of vacuum experimental technologies, the test for simulating space environments in ground laboratory has matured. Therefore, it is important to calibrate and measure light pressure exerted on and "felt" by the objects. Due to the non-perfect reflection, the measured pressure is a slight reduction in laboratory vacuum environments. But the light pressure "felt" by the objects is important to provide guidance for the design and control of solar sails.

Since the magnitude of light pressure is very small, it is impossible to measure and calibrate light pressure with conventional force measuring devices and calibrating devices.

II. H. Lebedev, who is the first person in history to relatively accurately measure light pressure, adopted a winglet fastened to a glass fiber to measure the light pressure. The light pressure acts on the winglet and thus makes the glass fiber twist, and then the light pressure can be worked out by measuring the value of torsion angle of the glass fiber.

Chinese patent publication No. CN 102322951A discloses a method for working out light pressure values from the micro displacements of mirrors illuminated by light. It is necessary in this method to use shock absorption elements, optical fiber displacement sensors, and capacitive displacement sensors, and thus the structural composition for implementing this method is very complicated.

Chinese patent publication No. CN 102252753A discloses a method for detecting infrared radiation with a cantilever resonant structure. It is necessary in this method to use the resonant structure manufactured with micro-nano processing techniques which is relatively complex and the dynamic response sensitivity of the cantilever is relatively low.

Chinese patent publication No. CN 103728017A discloses a method for calculating light pressure from the intensity and frequency of interference light formed by coupling the reflected light and the modulated light based on the vibration of the nano silver film illuminated by light. It is necessary in this method to generate the interference light with a fiber coupler, and demodulate the interference light with an optical phase demodulation device, and thus the structural composition for implementing this method is also very complex.

Furthermore, other devices for measuring light pressure mainly include thermopiles or piezoelectric multiplier tubes. The working principle of thermopile is to convert thermal energy into electrical energy, and output voltage correlate linearly to the value of the local temperature gradient. Thus, the light intensity could be calculated in turn, and then calculate the light pressure in accordance with the intensity-pressure relationship of light $P=I/c$ revealed by the special theory of relativity, wherein, P is light pressure, I is light intensity and c is the speed of light. The main principle of photomultiplier tube is to amplify the current created by light illumination hundredfold with the aid of photoelectric effect, and light intensity could be calculated from the amplified current value, and similarly the light pressure could be calculated in accordance with the intensity-pressure relationship of light.

With the development of material science, films with a thickness of nano magnitude have been successfully prepared. For example, metal films with a thickness of 20 nm can be prepared with the vacuum evaporation method proposed in "Nonlinear resistance effect of nano aluminum films" of LI ZhiRui.

SUMMARY OF THE DISCLOSURE

To overcome the above-noted and other deficiencies, and to overcome the problem of the structure of the device with sound, temperature and electronic components being relatively complicated, the present disclosure provides a gravity-based light pressure calibrating device and a corresponding method. The light pressure calibrating device is placed within a vacuum chamber which eliminates the interference of convectional current, and the light pressure calibration with an accuracy of 0.01 Micro Newton may be realized with such calibrating device and method. Due to gravity being accurately determined in physics, the accuracy of 0.01 Micro Newton can achieved by the value of the precision gravitational acceleration.

In one aspect of the present disclosure, a light pressure calibrating device is provided, the light pressure calibrating device comprises a vacuum chamber, a calibration platform, laser emitters and laser beam expanders for changing point light source to area light source; a sealing hatch is mounted on the top of the vacuum chamber; two entrance ports having an offset with respect to each other in the vertical direction are opened on the chamber wall and respectively on both sides of the vertical axis of the vacuum chamber; each laser emitter is connected to a corresponding laser beam expander and installed to direct to a corresponding entrance port on the wall of the vacuum chamber; and each of the entrance ports on the wall of the vacuum chamber, the corresponding laser emitter and the corresponding laser beam expander lie in the same vertical plane; there is an observation window on the wall of the vacuum chamber; and the calibration platform is fixed in the middle of the vacuum chamber.

The calibration platform comprises mirrors, a pure aluminum film, a quartz supporting panel, and a bracket; the quartz supporting panel is fastened at a position on the bracket having a distance of about one third of the height of the bracket from the top of the bracket, the pure aluminum film is placed on the middle of the quartz supporting panel; the mirrors include two rectangular thin plates including surfaces coated with silver, which are mounted on the top part of the bracket above the quartz supporting panel and on the bottom part of the bracket below the quartz supporting panel respectively; the silver-coated surfaces of the two mirrors are configured to be in parallel and opposite to each other while the angle could be adjusted; the silver-coated surface of each mirror faces to the corresponding entrance port of the vacuum chamber and lies in the same axis with the corresponding laser beam expander; the center of the quartz supporting panel and the center of the pure aluminum film as well as the centers of the two mirrors are all positioned on the central axis of the bracket.

In another aspect, a light pressure calibration method implemented by using the gravity-based light pressure calibrating device is provided, the method comprises the following steps:

Step 1. prior to the calibration, the gravitational acceleration at the experimental site where experiment is conducted is measured with three absolute gravimeters simultaneously and the measurement is repeated three times, then results are averaged to obtain a value of the gravitational acceleration;

Step 2. the vacuum chamber is evacuated with the internal pressure being maintained at $1 \times 10^{-5}$ Pa;

Step 3. two laser emitters are activated, and the laser beams enter into the vacuum chamber through the corresponding entrance ports on the wall of the vacuum chamber after passing through the corresponding laser beam expander mounted on the laser emitters;

Step 4. the output power of the upper laser emitter remains unchanged; and the output power of the lower laser emitter gradually increases in a step size of the smallest tunable output power unit of the laser emitter, when a critical state is reached where the light pressure difference between the two laser beams is equal to the gravity of the pure aluminum film, the output power of the lower laser emitter continuously increases, so as to make the pure aluminum film start to move upward to leave from the quartz supporting panel;

Step 5. the output power of the two laser emitters are tuned until the light pressure difference between the two laser beams is equal to the gravity of the pure aluminum film, so that the pure aluminum film stationarily levitates;

Step 6. When it is determined by a displacement detector that the pure aluminum film stationarily levitates, the light pressure difference $\Delta P$ between the two laser beams is equal to the gravity of the pure aluminum film, and the light pressure is calibrated via the gravity of the pure aluminum film; the calibration is completed.

The advantages achieved by the present disclosure are as follows: in the gravity-based light pressure calibrating device and the corresponding method of the present disclosure, the calibration platform is placed within a vacuum chamber, which eliminates the interference of convectional currents; each high power tunable laser emitter is connected to a corresponding laser beam expander, and the laser beams emitted by the laser emitters are expanded by the laser beam expanders mounted on the laser emitters, and then enter into the vacuum chamber through the entrance ports on the wall of the vacuum chamber as an area light source. The laser beams directed into the vacuum chamber are adjusted to project vertically by the mirrors mounted on the bracket within the vacuum chamber. The lower vertical laser beam adjusted by one mirror is illuminated on the bottom surface of the metal film on the quartz supporting panel through the quartz supporting panel, and the upper vertical laser beam adjusted by the other mirror is directly illuminated on the top surface of the metal film. When the metal film stationarily levitates, the light pressure difference between the two laser beams is equal to the gravity of the metal film, i.e., the light pressure difference $\Delta P$ is calibrated by the gravity of the metal film. As long as the value of the acceleration due to gravity is accurately determined, such a calibration could reach a precision level which could be compared with the accuracy of gravity.

In the gravity-based light pressure calibrating device of the present disclosure, laser beam expanders are used to expand the illuminated areas of the laser beams emitted by the high power tunable laser emitters, which effectively form a small area laser source. The calibration of a light pressure with an accuracy of 0.01 micro Newton in vacuum condition may be realized by adopting gravity as a "ruler" and by making the light pressure balance the weight of the metal films. The measured light pressure is exerted on and "felt" by the metal films and its magnitude is slightly reduced due to the non-perfect reflection.

BRIEF DESCRIPTION OF THE DRAWINGS

The device and method for gravity-based light pressure calibration of the present disclosure will be further explained in combination with the embodiments with reference to the accompanying figures. The present disclosure is illustrated by way of example, and not by way of limitation, in the figures of the accompanying drawings.

The components in the figures: 1—laser emitters, 2—laser beam expanders, 3—mirrors, 4—pure aluminum film, 5—quartz supporting panel, 6—bracket, 7—vacuum chamber.

DETAILED DESCRIPTION

The embodiment relates to a gravity-based light pressure calibrating device and calibration method.

Figure 1:
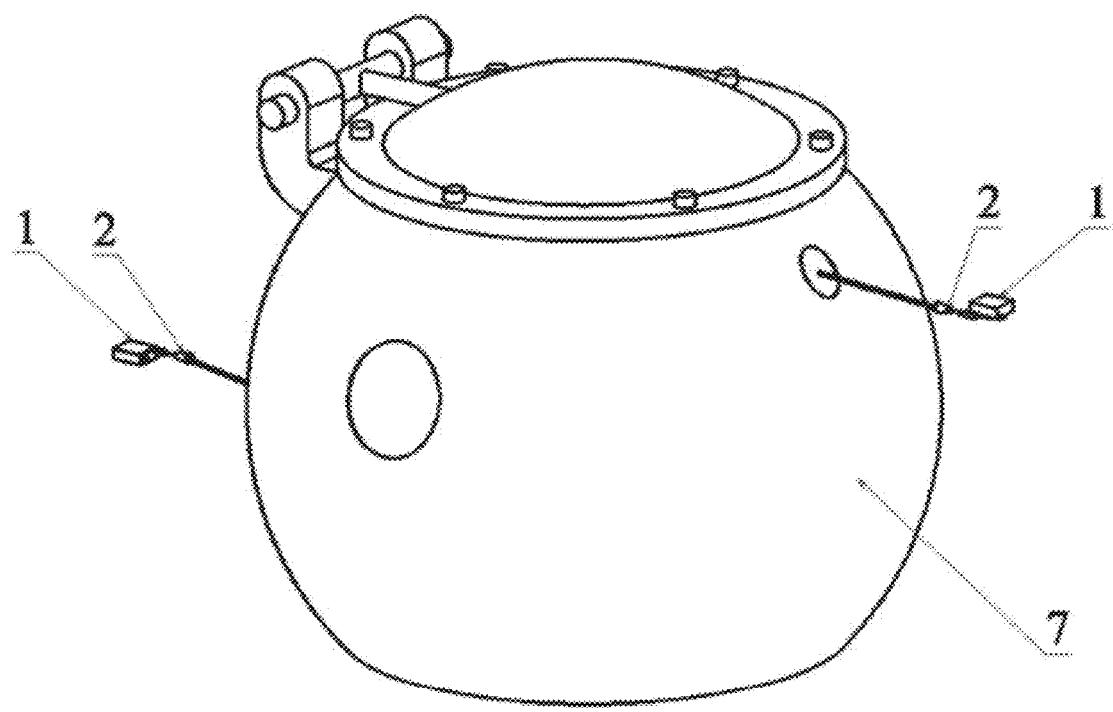
FIG. 1 shows a schematic view illustrating the vacuum chamber and light emission parts of the gravity-based light pressure calibrating device according to an embodiment of the present disclosure.
Figure 2:
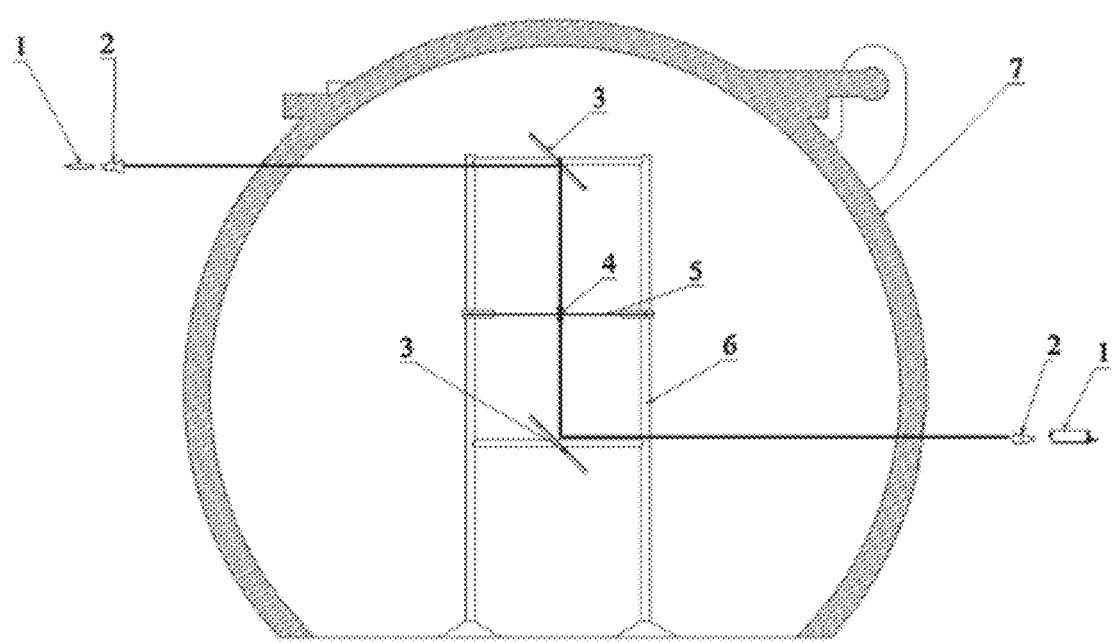
FIG. 2 shows a schematic view illustrating the gravity-based light pressure calibrating device according to an embodiment of the present disclosure.
Figure 3:
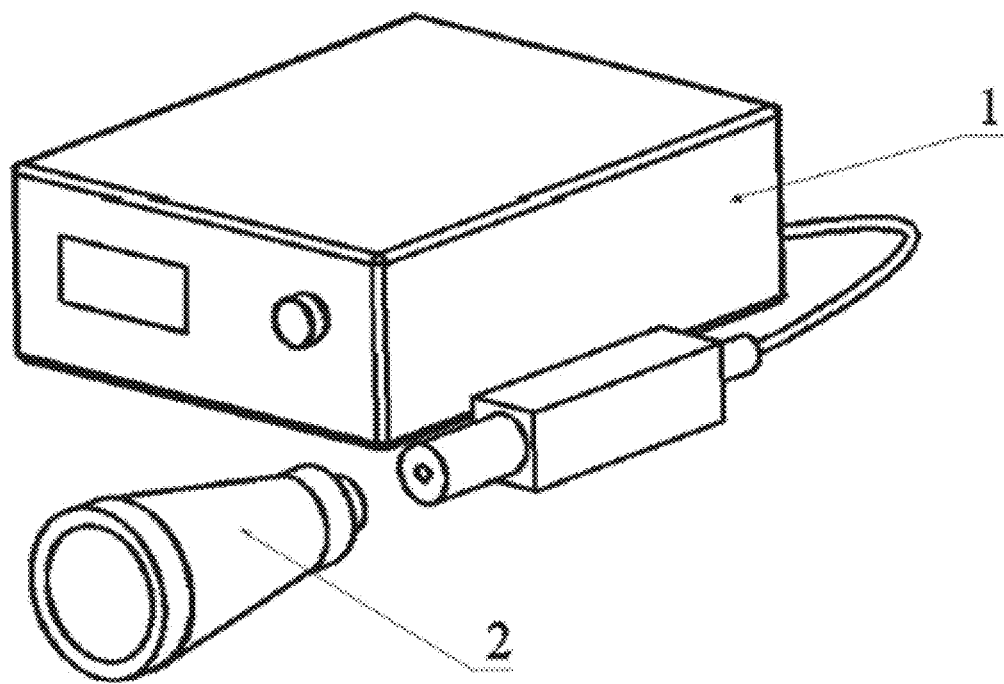
FIG. 3 shows a schematic view illustrating the laser emitter and laser beam expander according to an embodiment of the present disclosure.
Figure 4:
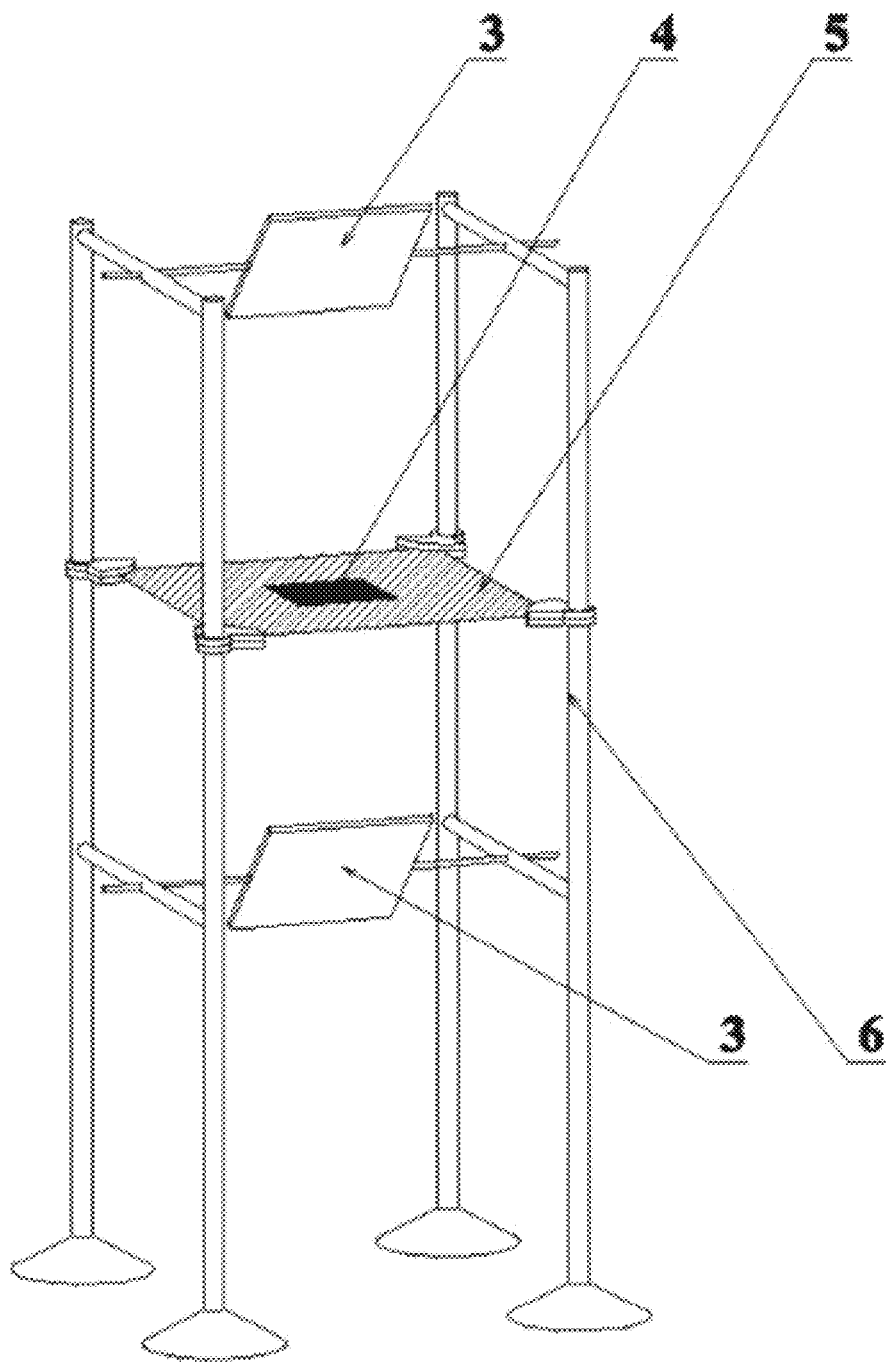
FIG. 4 shows a schematic view illustrating the calibration platform according to an embodiment of the present disclosure.

As shown in FIGS. 1-4, the gravity-based light pressure calibrating device of this embodiment comprises a vacuum chamber 7, a calibration platform, laser emitters 1 and laser beam expanders 2. The calibration platform is placed within the vacuum chamber with a diameter of 3 m and an internal pressure of $1 \times 10^{-5}$ Pa. A sealing hatch is mounted on the top of the vacuum chamber 7; two entrance ports having an offset with respect to each other in the vertical direction are opened on the chamber wall and on both sides of the vertical axis of the vacuum chamber 7. Each laser emitter 1 is connected to a corresponding laser beam expander 2 and installed to direct at a corresponding entrance port on the wall of the vacuum chamber. Each of the entrance ports on the wall of the vacuum chamber, the corresponding laser emitter 1 and the corresponding laser beam expander 2 lie in the same vertical plane. High power tunable laser emitters 1 have an output power of P=80~120 W, a wavelength of $\lambda$=512 nm, and a beam diameter of 3 mm. The illumination diameters of the generated laser beams are expanded tenfold through the laser beam expanders 2, and the laser beams are collimated before entering into the vacuum chamber 7. The intensities of the laser beams drop to 1% as the diameters are expanded tenfold. There is an observation window on the wall of the vacuum chamber.

The calibration platform is fixed in the middle of the vacuum chamber 7. The calibration platform comprises mirrors 3, a pure aluminum film 4, a quartz supporting panel 5, and a bracket 6, wherein the quartz supporting panel 5 is fastened at a position on the bracket 6 having a distance of about one third of the height of the bracket 6 from the top of the bracket 6, and the pure aluminum film 4 is placed on the middle of the quartz supporting panel 5. The mirrors 3 include two rectangular thin plates including surfaces coated with silver, which are mounted on the top of the bracket 6 above the quartz supporting panel 5 and on the bracket 6 below the quartz supporting panel 5 respectively. The silver-coated surfaces of the two mirrors 3 are configured to be in parallel and opposite to each other, while the angle could be adjusted. The silver-coated surface of each mirror 3 faces to the corresponding entrance port of the vacuum chamber and lies in the same axis with the corresponding laser beam expander 2. Each laser beam entering into the vacuum chamber is directed onto the corresponding mirror 3 with silver-coated surface, and then the upper laser beam is adjusted to travel downward and the lower laser beam is adjusted to travel upward. The lower laser beam is illuminated on the bottom surface of the circular pure aluminum film 4 with a thickness of 20 nm and a diameter of d=25.0 mm through the quartz supporting panel 5 fastened by the bracket 6, and the upper laser beam is directly illuminated on the top surface of the pure aluminum film 4. The center of the quartz supporting panel 5 and the center of the pure aluminum film 4 as well as the centers of the two mirrors 3 are all positioned on the central axis of the bracket 6.

In addition to the gravity-based light pressure calibrating device, this embodiment further provides a light pressure calibration method, characterized in that the calibration method includes the following steps.

Firstly, prior to the calibration, the gravitational acceleration at the experimental site where experiment is conducted is measured with three absolute gravimeters simultaneously and the measurement is repeated three times, and then the obtained measurement values are averaged for obtaining a sufficiently accurate value of the gravitational acceleration. The geologic structure is changing all the time; thus the value of the gravitational acceleration actually changes dynamically with time. Therefore, a preferred method is to place a plurality of absolute gravimeters at the experimental site simultaneously, and compare the measurement values to obtain the sufficiently accurate value of the gravitational acceleration. Moreover, it is preferred to average the multiple measurement values in order to take into account the system deviation of each absolute gravimeter.

Next, the vacuum chamber is evacuated with the internal pressure being maintained at $1 \times 10^{-5}$ Pa. Meanwhile, two high power tunable laser emitters are activated simultaneously, and the laser beams enter into the vacuum chamber through the corresponding entrance ports on the wall of the vacuum chamber after the illuminated areas of them are expanded by the corresponding laser beam expanders mounted on the laser emitters. The output power of the upper laser remains unchanged, and the output power of the lower laser gradually increases in a step size of the smallest tunable output power unit of the high power tunable laser. The output power of the two laser emitters are tuned until a critical state is reached where the light pressure difference between the two laser beams is equal to the gravity of the pure aluminum film, and then the output power of the lower laser continuously increases, so as to make the pure aluminum film start to move upward to leave from the quartz supporting panel and stationarily levitates.

Finally, when it is determined by a displacement detector that the pure aluminum film stationarily levitates, the light pressure difference ΔP between the two laser beams is equal to the gravity of the pure aluminum film, i.e., the light pressure is calibrated via the gravity of the pure aluminum film.

In addition, a light pressure which is an integral multiple of the light pressure calibrated by a single layer of pure aluminum film may be calibrated by changing the number of the stacked layers of pure aluminum films.

In this embodiment, the objective of illuminating both surfaces of the pure aluminum film with two laser beams respectively is to avoid surface deformation, rotation or wrinkle of the pure aluminum film originating from single surface illumination. The minimum calibrate scale of the gravity-based light pressure calibrating device according to this embodiment is determined by the weight of a single film. Here, the intensity of the circular pure aluminum film is $\rho=2700$ Kg/m$^3$, the thickness is h=20 nm and the diameter is d=25.0 mm, the gravitational acceleration g at the experimental site is 9.832. Thus the weight G of the pure aluminum film is:

$$G=mg=\rho Shg=2.70\times10^3\times3.142\times(12.5\times10^{-3})^2\times20.0\times10^{-9}\times9.832=0.261 \ \mu N$$

Therefore, the minimum light pressure difference that can be calibrated is 0.261 μN in the case of the circular pure aluminum film having a thickness of 20 nm and a diameter of 25.0 mm, and the local gravitational acceleration is 9.832. Correspondingly, a light pressure difference of 261 μN can be calibrated if 1000 circular pure aluminum films are placed.

The calibration of a light pressure with an accuracy of 0.01 micro Newton in vacuum conditions may be realized by adopting gravity as a "ruler" and making the light pressure balance the weight of the metal films. The measured light pressure is exerted on and "felt" by the metal films and its magnitude is slightly reduced due to the non-perfect reflection.

What is claimed is:

1. A gravity-based light pressure calibrating device comprising:
    a vacuum chamber;
    a calibration platform; and
    laser emitters and laser beam expanders, laser beam expanders expanding a section of a beam generated by the laser beam emitters to an area light source, wherein the calibration platform is fixed in middle of the vacuum chamber, and wherein the calibration platform further comprises:
    mirrors;
    a pure aluminum film;
    a quartz supporting panel; and
    a bracket.

2. The gravity-based light pressure calibrating device of claim 1, wherein a sealing hatch is mounted on a top of the vacuum chamber, two entrance ports having an offset with respect to each other in a vertical direction are opened on a wall and on both sides of the vertical axis of the vacuum chamber.

3. The gravity-based light pressure calibrating device of claim 2, wherein each of the laser emitters is connected to a corresponding laser beam expander and is installed to direct to a corresponding entrance port on the wall of the vacuum chamber, and each of the entrance ports on the wall of the vacuum chamber, the corresponding laser emitter and the corresponding laser beam expander lie in the same vertical plane, wherein the wall of the vacuum chamber comprise an observation window.

4. The gravity-based light pressure calibrating device of claim 1, wherein the quartz supporting panel is fastened at a position on the bracket having a distance of one third of a height of the bracket from the top of the bracket.

5. The gravity-based light pressure calibrating device of claim 4, wherein the pure aluminum film is placed on a middle of the quartz supporting panel, and wherein the mirrors include two rectangular plates comprising surfaces coated with silver, which are located on a top of the bracket above the quartz supporting panel and on the bracket below the quartz supporting panel, respectively.

6. The gravity-based light pressure calibrating device of claim 5, wherein the silver-coated surfaces of the two mirrors are configured to be in parallel and opposite to each other while the angle is adjusted.

7. The gravity-based light pressure calibrating device of claim 6, wherein the silver-coated surface of each mirror faces to the corresponding entrance port of the vacuum chamber and lies in the same axis with the corresponding laser beam expander, and wherein a center of the quartz supporting panel and a center of the pure aluminum film as well as centers of the two mirrors are all positioned on the central axis of the bracket.

8. A light pressure calibration method implemented by using the gravity-based light pressure calibrating device according to claim 1, characterized in that the method comprises:

prior to the calibration, measuring with three absolute gravimeters simultaneously, the gravitational acceleration at the experimental site where the experiment is conducted, wherein the measurement is repeated three times, and averaging the obtained measurement values to obtain a value of the gravitational acceleration;

evacuating the vacuum chamber with the internal pressure being maintained at $1\times10^{-5}$ Pa;

activating two laser emitters, wherein laser beams generated by the two laser emitters, through corresponding entrance ports on the wall of the vacuum chamber after passing through the corresponding laser beam expanders mounted on the laser emitters, enter into the vacuum chamber;

maintaining the output power of an upper laser emitter of the two laser emitters;

gradually increasing the output power of a lower laser emitter of the two laser emitters in a step size of a smallest tunable output power unit of the two laser emitters, wherein, when a critical state is reached where the light pressure difference between the two laser beams is equal to the gravity of a pure aluminum film, the output power of the lower laser emitter continuously increases, enabling the pure aluminum film to start to move upward to leave from the quartz supporting panel;

tuning the output power of the two laser emitters until the light pressure difference between the two laser beams is equal to the gravity of the pure aluminum film, and wherein the pure aluminum film stationarily levitates;

completing the calibration responsive to determining, by a displacement detector, that the pure aluminum film stationarily levitates, that the light pressure difference $\Delta P$ between the two laser beams is equal to the gravity of the pure aluminum film, and that the light pressure exerted on the pure aluminum film is calibrated via the gravity of the pure aluminum film.

* * * * *